(12) United States Patent
Schill

(10) Patent No.: US 7,244,174 B2
(45) Date of Patent: Jul. 17, 2007

(54) DEVICE FOR DE-RINDING AND SKINNING A PRODUCT TO BE TREATED

(75) Inventor: Joachim Schill, Kehl (DE)

(73) Assignee: Maja Maschinen-fabrik Hermann Schill GmbH & Co. KG, Kehl-Goldscheuer (DE)

( * ) Notice: Subject to any disclaimer, the term of this patent is extended or adjusted under 35 U.S.C. 154(b) by 93 days.

(21) Appl. No.: 10/478,116

(22) PCT Filed: May 16, 2001

(86) PCT No.: PCT/DE02/01755

§ 371 (c)(1),
(2), (4) Date: Jun. 1, 2004

(87) PCT Pub. No.: WO02/091842

PCT Pub. Date: Nov. 21, 2002

(65) Prior Publication Data

US 2004/0248509 A1 Dec. 9, 2004

(30) Foreign Application Priority Data

May 16, 2001 (DE) ................ 101 25 737

(51) Int. Cl.
A22C 17/00 (2006.01)

(52) U.S. Cl. ..................................... 452/130

(58) Field of Classification Search ............ None
See application file for complete search history.

(56) References Cited

U.S. PATENT DOCUMENTS

| | | | |
|---|---|---|---|
| 4,958,409 A | | 9/1990 | Braeger |
| 5,236,323 A | * | 8/1993 | Long et al. .................. 452/127 |
| 5,399,118 A | * | 3/1995 | Long et al. .................. 452/127 |
| 5,558,573 A | * | 9/1996 | Basile et al. ................. 452/127 |
| 6,089,968 A | * | 7/2000 | Andre et al. ................. 452/171 |
| 6,129,625 A | * | 10/2000 | Cate et al. ................... 452/127 |
| 6,213,863 B1 | | 4/2001 | Baseile, II |
| 6,277,019 B1 | * | 8/2001 | Veldkamp et al. .......... 452/134 |

FOREIGN PATENT DOCUMENTS

DE 1454072 10/1969
DE 4322478 1/1994

* cited by examiner

Primary Examiner—Thomas Price
(74) Attorney, Agent, or Firm—Orum & Roth LLC

(57) ABSTRACT

The invention relates to a device for skinning and de-rinding a product to be treated such as pieces of meat or fish and similar products (2), said product to be treated being first skinned from one side by means of a first skinning unit (3). A combination of a first conveyer belt (12) and a reversing belt (13) reverses the piece of meat. A second skinning unit (15 removes the remaining fat and skin (10) from the other side of the product (2) to be treated.

20 Claims, 4 Drawing Sheets

DEVICE FOR DE-RINDING AND SKINNING A PRODUCT TO BE TREATED

STATE OF THE ART

Figure 1:
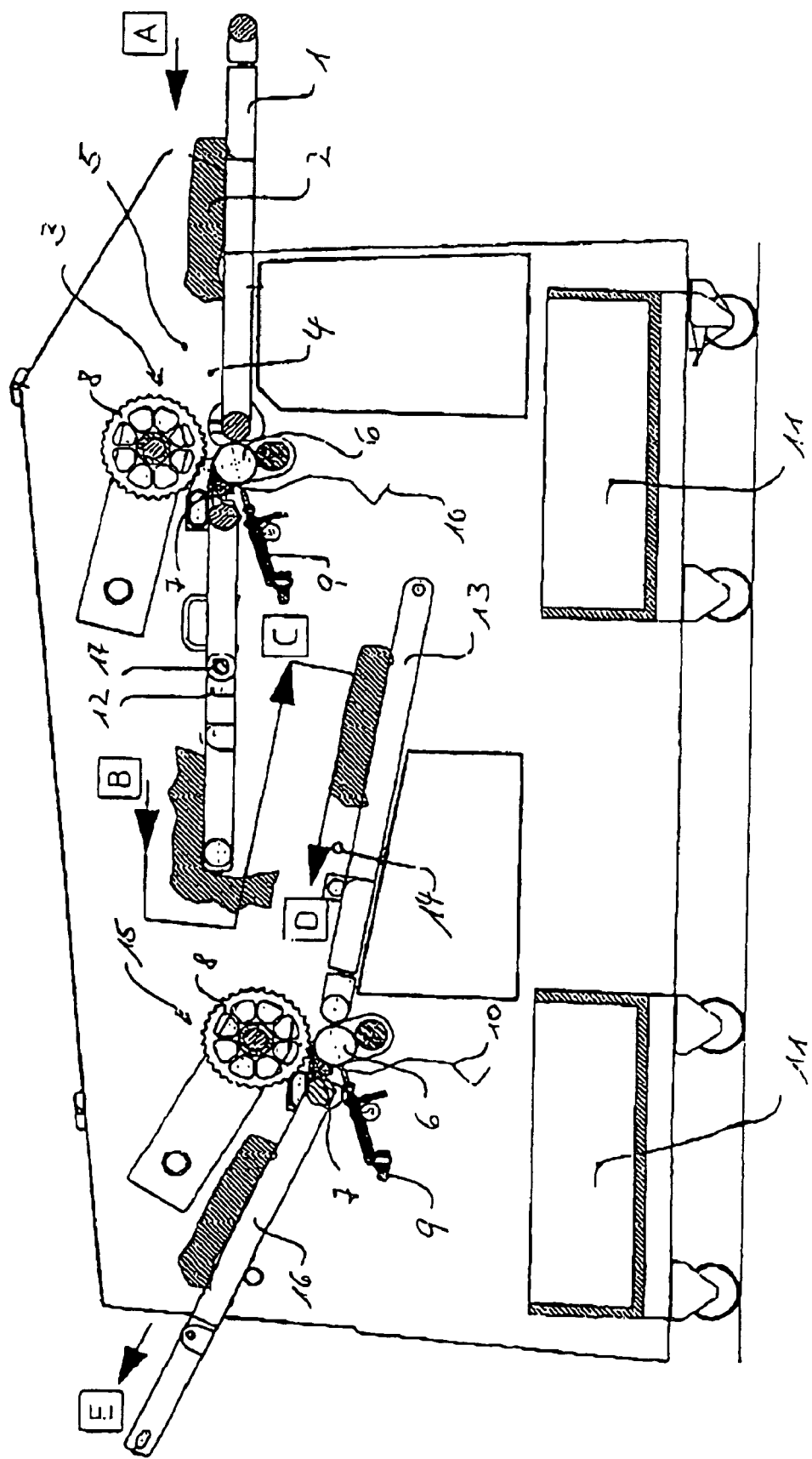

The invention concerns a device for the de-rinding and skinning of a product to be treated in accordance with the preamble of claim 1.

Such devices serve to remove from a product to be treated undesirable layers like fat or skin, in particular, from pieces of meat or fish. The product to be treated is taken hold of by means of a drawing roller and is pressed against the cutting element of a cutting unit. The cutting element is, for example, a blade. By rotating the drawing roller, the product to be treated is moved relative to the cutting element and the undesired layer of the product to be treated is removed by the cutting element. An additional press roller serves to press the product to be treated against the cutting unit. The predominantly flat product to be treated is continuously moved over and away from the cutting unit by the drawing roller and the press roller without being turned. Such devices are, for example, known from EP 197 39 618 A1 and DE 197 39 618 A1.

The known devices have the disadvantage that the product to be treated is only skinned from one side. If both sides need to be skinned, then the already skinned product to be treated must be turned by a person and reinserted into the device. This type of procedure is time-consuming and expensive.

THE INVENTION AND ITS ADVANTAGES

In contrast, with the device in accordance with the invention with the typical characteristics of claim 1, the predominantly flat product to be treated is automatically turned after skinning and skinned on the other side as well. For this, a turning belt is provided below the first removal belt. This turning belt can change its transport direction. It feeds the product to be treated to a second skinning unit.

The mode of operation of the machine consists in that the product to be treated is first fed to a first skinning unit. The product to be treated is thereby picked up by a rotating drawing roller and fed to the skinning blade of a cutting unit. The spring-mounted blade girder automatically adjusts to the thickness of the skin, so that an optimal skinning result is obtained. The removed fat and skin remains, which are also called fleece, fall downwards. The skinned product to be treated is transported away from the first skinning unit via the first removal belt. At the end of the first skinning unit, the product to be treated falls onto the lower-lying turning belt. At this point, the turning belt moves in the opposite direction of the removal belt. The transport direction only changes when the product to be treated is completely resting on the turning band. The product to be treated is then transport in the same direction as the first removal belt. The product to be treated is turned by the downward falling and the opposite transport direction of the turning band. Then the product to be treated is fed by the turning band to a second skinning unit. A second rotating drawing roller takes hold of the product to be treated and feeds it to a second spring-mounted skinning blade. The fat and skin remains removed from the second side also fall downwards.

The skinning and de-rinding of the predominantly flat product to be treated occurs on both sides through the device. The manual turning by an operator is eliminated. Moreover, processing is faster than via manual turning.

In accordance with an advantageous design of the invention, a supply belt is provided before the first skinning unit and a second removal belt is provided before the second skinning unit. In this way, the product to be treated is automatically transported to processing and is diverted after processing. Drive mechanisms, which set the speed of the belts, are provided for the supply belt, the first removal belt, the turning belt, and the second removal belt. The speed, as seen from the processing direction, increases from belt to belt. The speed of the supply belt is the lowest, while that of the second removal belt is the highest. This prevents the product to be treated from becoming pushed together or folded on one of the belts. The product to be treated always lies flat and smooth on the belts due to the increasing speed.

In accordance with another advantageous design of the invention, a sensor is provided on the turning belt and captures the length of the product to be treated. The sensor recognizes when the product to be treated is resting completely on the turning belt. The sensor is connected with a control for the drive mechanism of the turning belt. It ensures that the transport direction of the turning band automatically switches when the product to be treated is resting completely on the turning band.

In accordance with another advantageous design of the invention, a sensor for recognizing the length and a sensor for recognizing the thickness of a product to be treated are provided before the first skinning unit. The sensor for recognizing the length is connected with a control for the drive mechanism of the supply belt. This ensures that the supply belt remains stationary when the product to be treated is taken hold of by the first skinning unit. Thus, no other product to be treated can be fed to the first skinning unit until the product to be treated has left the first skinning unit.

The supply belt starts up again either based on a predetermined unit of time or by recognizing the product to be treated through the sensor on the turning band.

In accordance with another advantageous design of the invention, the first removal belt is arranged so that it can at least be partially pivoted. The tilt of this section can be set through a drive mechanism. In this way, the distance between the first removal belt and the turning belt is variable. The two sensors before the first skinning unit, which capture the thickness and the length of the product to be treated, are connected with the control for the drive mechanism of the tilt of the first removal belt. The distance between the first removal belt and the turning belt is thereby modified depending on the thickness and length of the product to be treated. This ensures that the turning of the product to be treated occurs in a reliable manner.

In accordance with another advantageous design of the invention, a press roller, which presses the product to be treated from above against the cutting unit, is provided on the first and/or the second skinning unit. A drive mechanism sets the height of the press roller over the cutting unit depending on the thickness of the product to be treated, which is recognized by a sensor in front of the skinning unit. Thus, the pressure, with which the press roller presses the product to be treated against the cutting unit, is adjusted according to each product to be treated.

In accordance with another advantageous design of the invention, the turning belt and the second removal belt are tilted horizontally. In this way, the level of the supply belt and the end of the second removal belt are at least almost identical.

If the product to be treated is fed to further processing machines by the second removal belt, then the level of these machines does not need to be specially adjusted to the device for de-rinding and skinning.

In accordance with another advantageous design of the invention, the downward falling fat and skin remains are taken up by a container or by a transport band. This makes the removal of the fleece from the device easier.

Other advantages and advantageous designs of the invention can be taken from the following description, the drawing and the claims.

DRAWING

One embodiment of the object of the invention is represented in the drawings and described in greater detailed below. The drawings show the following:

FIG. 1 A side view of a device for de-rinding and skinning with an open housing.

Figure 2:
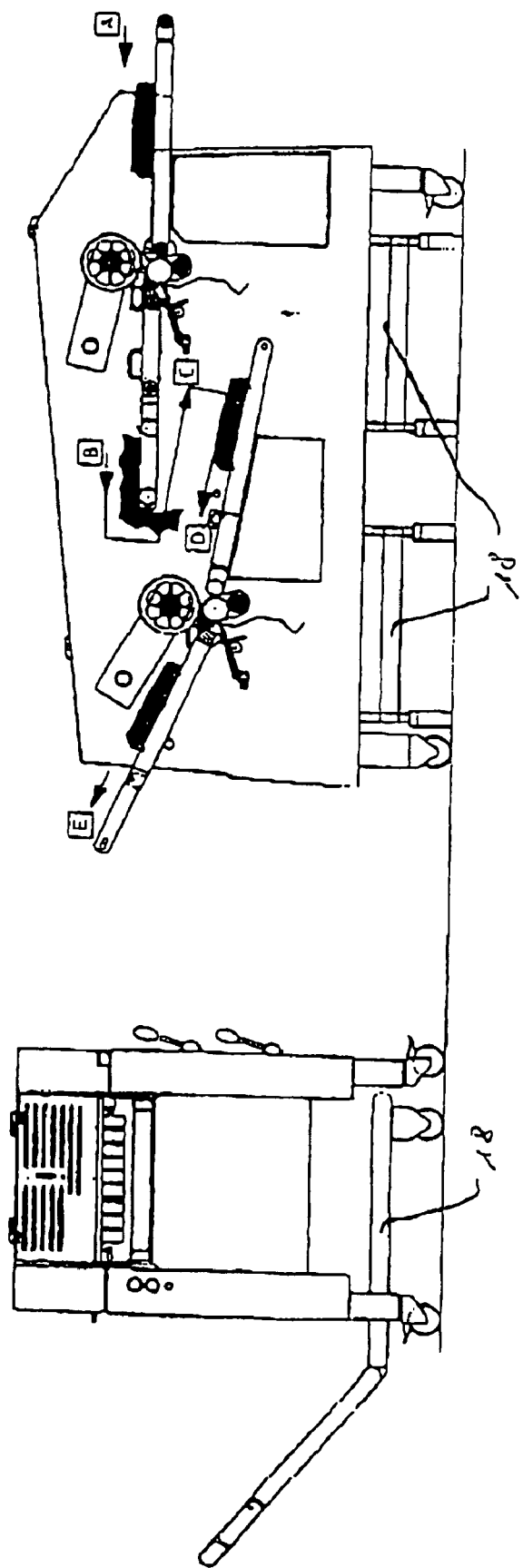

FIG. 2 A side view of a device in accordance with FIG. 1 and a view from the front with two transport belts for the fleece.

Figure 3:
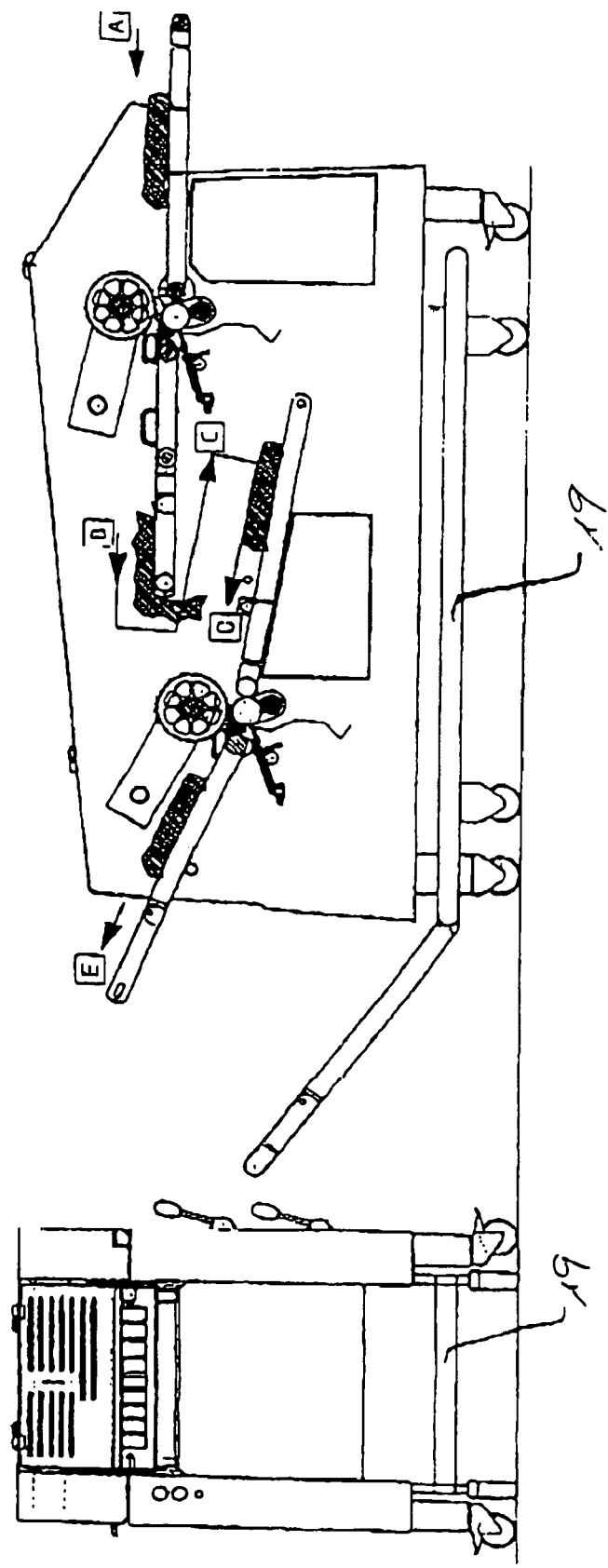

FIG. 3 A side view of a device in accordance with FIG. 1 and in a view from the front with a continuous transport belt for the fleece.

Figure 4:
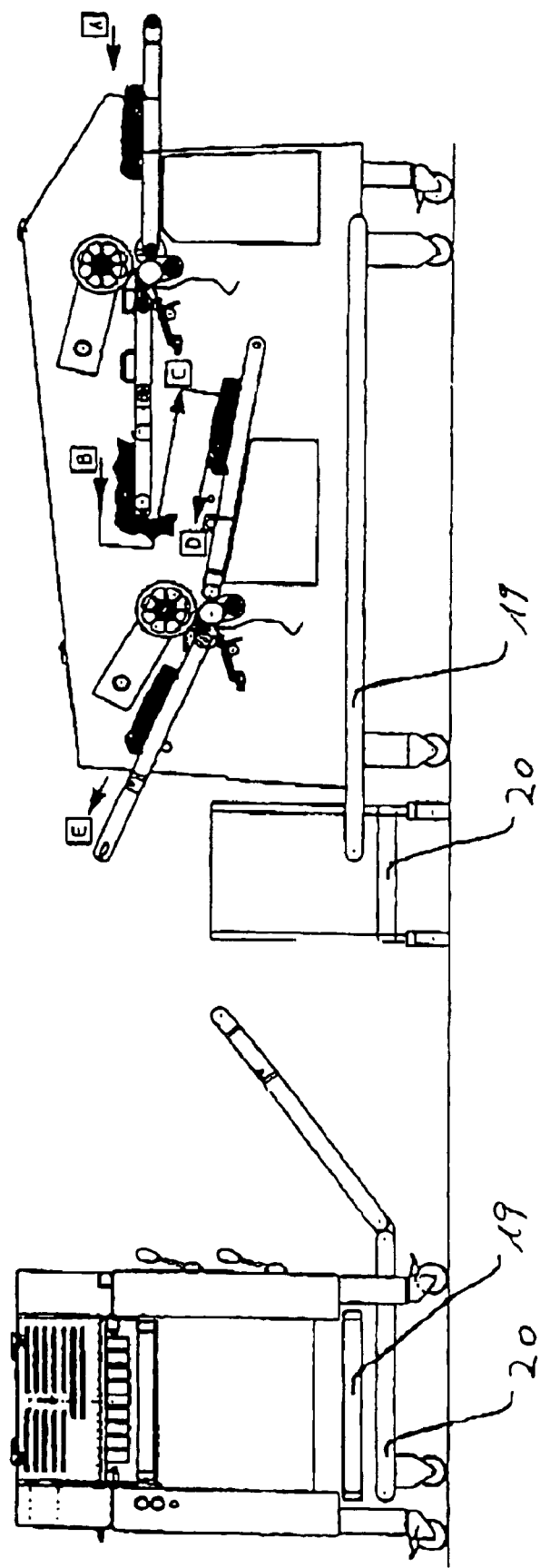

FIG. 4 A side view of a device in accordance with FIG. 1 and in a view from the front with a transport belt and an accumulation bin for the fleece.

DESCRIPTION OF THE EMBODIMENTS

FIG. 1 shows the side view of a device for de-rinding and skinning. A piece of meat 2 is fed to a first skinning unit 3 via a supply belt 1. The length and the thickness of the piece of meat are recognized by the two photo sensors 4 and 5. When the piece of meat has completely passed the photo sensor 4, the supply belt 1 stops. Thus, no further piece of meat can be fed to the first skinning unit 3. The piece of meat 2 is now taken hold of by the rotating drawing roller 6 and is fed to the skinning blade of the cutting unit 7. A press roller 8 ensures that the piece of meat is pressed from above against the cutting unit 7. Pieces of meat that stick to the drawing roller 6 are removed by a compressed-air device 9. The fat and skin remains 10 removed by the cutting unit fall downward into an accumulation bin 11. The piece of meat 2 skinned on the bottom is transported away from the first skinning unit 3 by the first removal belt 12. The transport direction of the supply belt 1 and the first removal belt 12 is indicated by the arrows A and B in FIG. 1. The piece of meat 2 falls downward onto the turning band 13 at the end of the first removal belt 12. At this point the turning band moves in the opposite transport direction as the first removal belt 12. This transport direction is indicated by the arrow C in FIG. 1. Through the opposite transport directions of the first removal band 12 and the turning band 13, the piece of meat is turned as it falls onto the lower lying turning band. A photo sensor 14 recognizes when the piece of meat 2 has completely passed the photo sensor and thus lies on the turning band. Then the transport direction of the turning band 13 changes. This is indicated by the arrow D in FIG. 1. The piece of meat is thereby fed to a second skinning unit 15. This is identical to the structure of the first skinning unit 3. It also has a drawing roller 6, a cutting unit 7, a press roller 8, a compressed-air device 9, and an accumulation bin 11 for the removed fat and skin remains 10. The not-yet-processed side of the piece of meat 2 is then skinned and carried away from the device via a second removal belt 16.

The first removal belt 12 has a joint 17 so that the tilt of the section turned away from the first skinning unit 3 can be adjusted. The associated drive mechanism is not shown in the drawing. In this way, the separation distance between the back end of the first removal belt 12 and the turning belt 13 can be varied depending on the length and thickness of the piece of meat that is recognized by the photo sensors 4 and 5.

While the supply belt 1 and the first removal belt 12 are arranged horizontally with the exception of the tiltable section of the first removal belt, the turning band 13 and the second removal belt 16 have a gradient that is tilted with respect to the horizontal plane. This ensures that the output of the processed piece of meat 2 takes place on the same level as the infeed of the piece of meat into the device. Moreover, this arrangement also achieves a relatively small and compact design of the device.

The structure of the devices shown in FIGS. 2, 3, and 4 are identical with the device shown in FIG. 1. They only differ from the device shown in FIG. 1 in that they have different transport belts for the removed fat and skin remains or fleece. The device in accordance with FIG. 2 has two transport belts 18 for the fleece instead of two accumulation bins 11. The transport direction of these belts runs perpendicular to the processing direction of the product to be treated. The transport belt runs with a tilt upwards on the outside of the device for de-rinding and skinning. The fleece can, for example, fall into an accumulation bin from the end of the transport band. The device in accordance with FIG. 3 has a continuous transport belt 19 for the fleece, which has the same transport direction as the supply belt, the turning belt, and the removal belts. The device in accordance with FIG. 4 has a transport belt 19 longitudinal to the processing direction and a transport belt 20 diagonal to the transport direction.

All characteristics of the invention can be integral to the invention individually as well as in any combination with each other.

LIST OF REFERENCES

1 Supply Belt
2 Piece of Meat
3 First Skinning Unit
4 Photo Sensor for the Length of the Piece of Meat
5 Photo Sensor for the Thickness of the Piece of Meat
6 Drawing Roller
7 Cutting Unit
8 Press Roller
9 Compressed-Air Device
10 Fat and Skin Remains
11 Accumulation Bin
12 First Removal Belt
13 Turning Belt
14 Photo Sensor
15 Second Skinning Unit
16 Second Removal Belt
17 Joint
18 Transport Belt for the Fleece
19 Transport Belt for the Fleece
20 Transport Belt for the Fleece

The invention claimed is:

1. Device for skinning and de-rinding a product to be treated with a first skinning unit comprising a cutting unit, a press roller feeding the product to be treated to the cutting unit a transport unit comprising a first removal belt for diverting the product to be treated, which is skinned by the first skinning unit, a turning band provided below the first removal belt, onto which the product to be treated can fall from the end of the first removal belt tilted away from the first skinning unit, a drive mechanism of the turning band transports the product to be treated first in a first direction opposite to the transport direction of the first removal belt and then in a second direction identical to the transport direction of the removal belt, and a second skinning unit at the end of the turning band, wherein the structure removes a layer of material from each of two sides of the product.

2. Device in accordance with claim 1, characterized in that a supply belt feeding the product to be treated to the first skinning unit is provided and in that a second removal belt feeding the product to be treated away from the second skinning unit is provided.

3. Device in accordance with claim 2, wherein the turning band and the removal belt are arranged in a tilted manner with respect to the horizontal plane and the level of the supply belt is at least approximately identical to the level of the end of the second removal belt.

4. Device in accordance with claim 2, further comprising a sensor for the turning band, which registers the passing of the product to be treated, the sensor is connected to a control of the drive mechanism of the turning band.

5. Device in accordance with claim 4, further comprising a second sensor, which captures the length of the product to be treated provided before the first cutting unit.

6. Device in accordance with claim 5, further comprising a third sensor, which captures the thickness of the product to be treated, provided before the first cutting unit.

7. Device in accordance with claim 1, wherein the turning band sensor that registers the passing of the product to be treated, the sensor is connected to a control for the drive mechanism of the turning band.

8. Device in accordance with claim 7, wherein the sensor is a photo sensor.

9. Device in accordance with claim 7, wherein the control is connected to the sensor on the turning belt.

10. Device in accordance with claim 1, further comprising a first sensor that captures the length of the product to be treated provided before the first skinning unit.

11. Device in accordance with claim 10, further comprising a drive mechanism for modifying the tilt of at least one section of the first removal belt, said at least one section is arranged in a tiltable manner the drive mechanism is connected to the sensor before the first skinning unit.

12. Device in accordance with claim 10, wherein the sensor is connected to a control for the drive mechanism for the supply belt, whereby the control ensures that the drive mechanism is suspended when the product to be treated has passed the sensor.

13. Device in accordance with claim 1, further comprising a sensor that captures the thickness of the product to be treated provided before the first skinning unit.

14. Device in accordance with claim 1, wherein at least one section of the first removal belt is arranged in a tiltable manner in order to modify the tilt of this removal belt section.

15. Device in accordance with claim 1, further comprising a press roller for pressing the product to be treated against the cutting unit from above provided on the first and/or second skinning unit and a drive mechanism for setting the height of the press roller over the cutting unit, whereby the drive mechanism is connected to a sensor for recognizing the thickness of the product to be treated.

16. Device in accordance with claim 1, further comprising drive mechanisms for the supply belt, the first removal belt, the turning belt, and the second removal belt, the drive mechanisms predetermine the speed, and the speed increases in the processing direction form belt to belt.

17. Device in accordance with claim 16, wherein the turning band and the second removal belt are tilted away from the horizontal plane and the level of the supply belt is at least approximately identical to the level of the end of the second removal belt.

18. Device in accordance with claim 17, characterized in that a transport belt is provided below the cutting units for collecting and diverting fat and skin remains removed from the product to be treated.

19. Device in accordance with claim 1, further comprising containers provided below the first and second skinning units for collecting fat and skin remains removed from the product to be treated.

20. Device in accordance with claim 1, further comprising a transport belt below the cutting units for collecting and diverting fat and skin remains removed from the product to be treated.

* * * * *